Mar. 13, 1923.
C. A. BODDIE
1,448,380
REGULATOR FOR REGENERATIVE CONTROL SYSTEMS
Filed Sept. 11, 1920
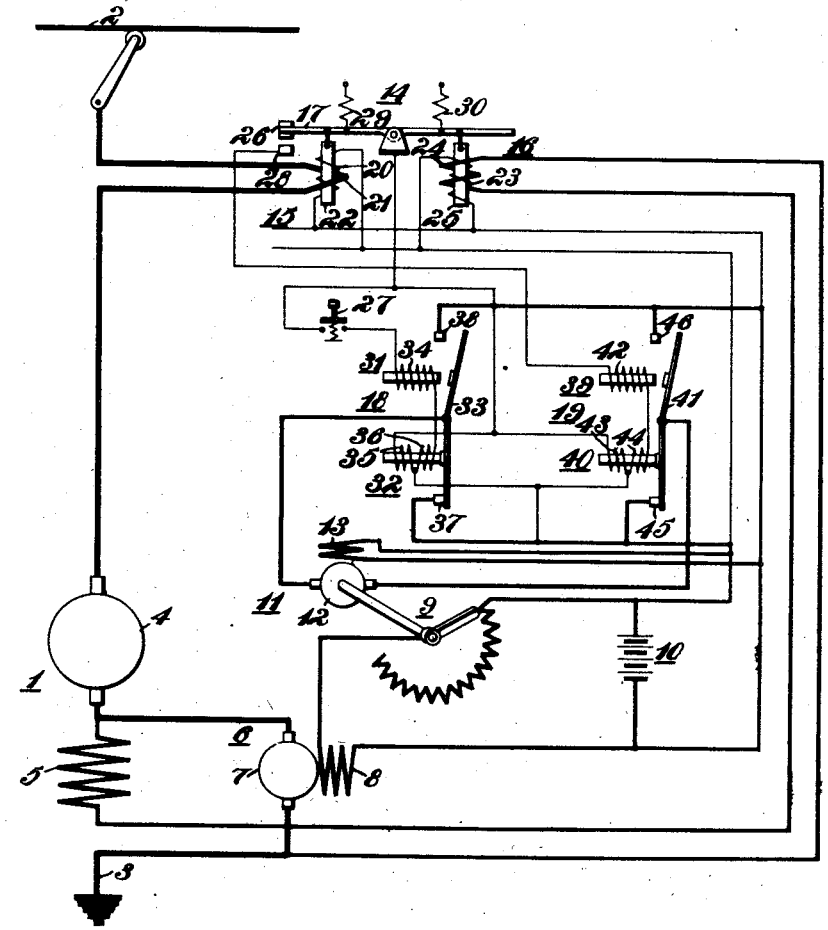
WITNESSES:
J. P. Wurmb.
W. B. Wells
INVENTOR
Clarence A. Boddie.
BY
Lesley G. Barr
ATTORNEY Patented Mar. 13, 1923.

1,448,380

UNITED STATES PATENT OFFICE.

CLARENCE A. BODDIE, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR FOR REGENERATIVE CONTROL SYSTEMS.

Application filed September 11, 1920. Serial No. 409,718.

*To all whom it may concern:*

Be it known that I, CLARENCE A. BODDIE, a citizen of the United States, and a resident of Wilkinsburg, in the county of Allegheny and State of Pennsylvania, have invented a new and useful Improvement in Regulators for Regenerative Control Systems, of which the following is a specification.

My invention relates to regulator systems, and, particularly, to systems for governing the excitation of dynamo-electric machines.

One object of my invention is to provide a regulator system for a dynamo-electric machine that shall maintain the ratio of armature current to field-magnet-winding current within certain predetermined limits.

In operating many dynamo-electric machines and, particularly, in operating the motors of a vehicle as generators for regenerating energy, trouble is experienced in preventing the so-called "flash-over" condition at the commutator brushes. Such "flash-over" condition is generally produced when the ratio between the armature current and the field-magnet-winding current exceeds certain predetermined limits. During regenerative operation of electric locomotives, "flash-over" conditions are very liable to be experienced unless extreme care is taken to prevent an excessively high armature current.

In a regulator system constructed in accordance with my invention, means is provided for automatically preventing the ratio of the armature current to the field-magnet-winding current from exceeding certain predetermined limits.

The regulator system comprises an electromagnet, which is energized in accordance with the current flowing through the armature of the dynamo-electric machine to be regulated, and a second electromagnet which is energized in accordance with the current flowing through the field-magnet winding of the dynamo-electric machine. The electromagnets jointly control the operation of a motor-operated rheostat to govern the operation of an exciter generator which is connected to the field-magnet winding of the main machine. The regulator is so adjusted as to prevent the ratio of the armature current to the field-magnet-winding current from exceeding any desired limit.

The single figure in the accompanying drawing is a diagrammatic view of a regulator system embodying my invention.

Referring to the drawing, a dynamo-electric machine 1, which may be a motor of an electric locomotive, is connected across a supply circuit comprising a trolley conductor 2 and a ground return conductor 3. The dynamo-electric machine 1 embodies an armature 4 and a field-magnet winding 5. The field-magnet winding 5 is energized by means of an exciter generator 6 comprising an armature 7 and a field-magnet winding 8. The field-magnet winding 8 of the exciter generator 6 is connected, in series with a rheostat 9, to a source of current, such as a storage battery, 10. The rheostat 9 is operated by an auxiliary motor 11 comprising an armature 12 and a field-magnet winding 13.

The auxiliary motor 11, which controls the rheostat 9, is governed by means of a regulator 14 in accordance with the current flowing through the armature 4 and the current flowing through the field-magnet winding 5. The regulator 14 comprises an electromagnet 15, which is energized in accordance with the current flowing through the armature 4, and a second electromagnet 16, which is energized in accordance with the current flowing through the field-magnet winding 5. The two electromagnets 15 and 16 control a contact arm 17 for governing the operation of a switch 19. A second switch 18 is controlled by the engineer's contact button 27. The two switches 18 and 19 govern the operation of the auxiliary motor 11.

The electromagnet 15 comprises a coil 20, which is connected across the battery 10, a coil 21, which is connected in series with the armature 4, and a core armature 22 which is pivotally connected to the contact arm 17. The electromagnet 16 comprises a coil 23, which is connected across the battery 10, a coil 24, which is connected in series with the field-magnet winding 5, and a core armature 25, which is also pivotally connected to the contact arm 17.

The contact arm 17 is pivotally mounted intermediate the two core armatures 22 and 25 and carries a contact member 26, which is adapted to engage a stationary contact member 28, according to the operation of the two electromagnets 15 and 16. Two spring members 29 and 30 are connected to the contact arm 17 for maintaining it in a neutral position under normal conditions.

The switch 18 comprises two electromagnets 31 and 32 and a switch arm 33 which is jointly controlled by the two electromagnets 31 and 32. The electromagnet 31 comprises a single coil 34, and the electromagnet 32 comprises two differentially related coils 35 and 36. The switch arm 33 engages a stationary contact member 37 in the released position shown and, in an operative position, engages a stationary contact member 38. The coil 35 of the electromagnet 32 is permanently connected across the battery 10 for biasing the switch arm 33 toward the released position shown. Upon operation of the contact button 27, a circuit is completed for energizing the coil 34 of the electromagnet 31 and the coil 36 of the electromagnet 32. The coil 36 neutralizes the action of the holding coil 35, and the coil 34 operates the switch arm 33 to engage the stationary contact member 38.

The switch 19 comprises an electromagnet 39, a second electromagnet 40 and a switch arm 41 which is controlled by the two electromagnets. The electromagnet 39 comprises a single coil 42, and the electromagnet 40 comprises two differentially related coils 43 and 44. The switch arm 41 engages a stationary contact member 45 in the released position shown and engages a stationary contact member 46 in the operative position. The coil 43 of the electromagnet 40 is connected across the battery 10 for biasing the switch arm 41 toward the released position shown. The two coils 42 and 44 are connected in series across the battery 10 upon engagement between the two contact members 26 and 28 of the regulator 14. The coil 44 neutralizes the action of the coil 43 and the coil 42 moves the switch arm 41 to the operative position.

The field-magnet winding 13 of the auxiliary motor 11 is directly connected across the battery 10 and the armature 12 of such motor is selectively connected across the battery 10 by means of the switches 18 and 19. The switch 18, when operated by the contact button 27, effects operation of the motor 11 in a clockwise direction, and the switch 19, upon engagement between the contact members 26 and 28, effects rotation of the motor 11 in a counter-clockwise direction. The clockwise direction of the motor 11 increases the resistance value of the rheostat 9 included in circuit with the exciter field-magnet winding 8, and the counter-clockwise rotation of the motor decreases the resistance value of the rheostat 9 included in such circuit. The exciter generator 6, in turn, controls the current flowing through the main field-magnet winding 5.

Assuming the current flowing through the armature 4 to be abnormally high, as compared with the current flowing through the field-magnet winding 5, the electromagnet 15 is energized to a higher degree than the electromagnet 16. Accordingly, the contact arm 17 is operated to effect engagement between the contact members 26 and 28 for increasing the value of the current flowing through the field-magnet winding 5. Upon engagement between the contact members 26 and 28, a circuit is completed from one terminal of the battery 10, through the contact arm 17, contact members 26 and 28 and coils 42 and 44, to the other terminal of the battery 10. The coil 44 neutralizes the action of the holding coil 43, and the coil 42 operates the switch arm 41 for connecting the armature 12 across the battery 10.

The circuit through the armature 12 extends from one terminal of the battery 10, through the contact member 46, switch arm 41, armature 12, switch arm 33, and the contact member 37, to the other terminal of the battery 10. The motor 11 is rotated in a counter-clockwise direction to decrease the resistance value of the rheostat 9 included in circuit with the field-magnet winding 8. Accordingly, the excitation of the exciter generator 6 is increased to increase the current flowing through the main field-magnet winding 5.

Such operation is continued until a proper ratio of armature current to the field-magnet-winding current is effected. Thereupon, the contact arm 17 is operated to separate the contact members 26 and 28 and to release the switch 19. Upon the release of the switch arm 41, a dynamic-braking circuit is completed for the motor 11, which is traced from one terminal of the armature 12 through the switch arm 41, contact member 45, contact member 37 and switch arm 33 to the other terminal of the armature 12.

The value of the current flowing through the armature 4 is raised by operating the contact button 27. Upon operation of the contact button 27, a circuit is completed which extends from one terminal of the battery 10, through the contact button 27, and the coils 34 and 36 of the switch 18, to the other terminal of the battery 10. The coil 36 neutralizes the action of the coil 35, and the coil 32 moves the switch arm 33 into engagement with the contact member 38.

Thereupon, the armature 12 is connected across the battery 10 for rotating the motor 11 in a clockwise direction. The circuit through the armature 12 is traced from one terminal of the battery 10, through the contact member 38, switch arm 33, armature 12, switch arm 41 and the contact member 45, to the other terminal of the battery 10. The rheostat 9 is operated to increase the resistance included in circuit with the field-magnet winding 8, and, consequently, to decrease the current flowing through the main field-magnet winding 5. The above operation of the regulator is continued to maintain any desired ratio between the current flowing through the armature 4 and the current flowing through the field-magnet winding 5.

Modifications in the system, and in the arrangement and location of parts may be made within the spirit and scope of my invention, and such modifications are intended to be covered by the appended claims.

I claim as my invention:

1. In a regulator system, the combination comprising a momentum operated dynamo-electric machine having an armature and a field-magnet winding, and means for automatically varying the current flowing through said field-magnet winding above and below a predetermined normal value to limit the ratio of the currents flowing through the armature and the field-magnet winding.

2. In a regulator system, the combination with a momentum operated dynamo-electric machine having an armature and a field-magnet winding, of a magnet operated in accordance with the current flowing through said armature, and having a core armature, and a second magnet operated in accordance with the current flowing through said field-magnet winding and also having a core armature, of means jointly controlled by the operation of said magnets for limiting the ratio of the currents flowing through the armature and the field-magnet winding.

3. In a regulator system, the combination comprising a momentum operated dynamo-electric machine and means for automatically maintaining the ratio of the armature current to the field-magnet winding current within certain limits comprising means for controlling said field-magnet-winding current above and below a predetermined normal value.

4. In a regulator system, the combination comprising a dynamo-electric machine having an armature and a field-magnet winding, and means jointly controlled by the currents flowing through the armature and the field-magnet winding for controlling the excitation of the field-magnet winding above and below a predetermined normal value.

5. In a regulator system, the combination comprising a dynamo-electric machine having an armature and a field-magnet winding, and means comprising two electromagnets having independent core armatures and respectively controlled by the currents flowing through the armature and the field-magnet winding for governing the excitation of the field-magnet winding.

6. In a regulator system, the combination with a dynamo-electric machine having an armature and a field-magnet winding, an exciter generator for exciting said field-magnet winding, and a motor-operated rheostat for controlling the excitation of said exciter generator, of means comprising two electromagnets respectively operated in accordance with the energization of said armature and the energization of said field-magnet winding and a lever arm controlled thereby for governing the operation of said motor-operated rheostat.

7. In a regulator system, the combination with a dynamo-electric machine having an armature and a field-magnet winding, of a regulator having one magnet energized in accordance with the energization of said armature and a second magnet energized in accordance with the energization of said field-magnet winding, and a lever arm controlled thereby, of means comprising a motor-operated rheostat controlled by said regulator for governing the excitation of said field-magnet winding.

8. In a regulator system, the combination with a dynamo-electric machine having an armature and a field-magnet winding and an exciter generator for exciting said field-magnet winding above and below a predetermined normal value, of means for controlling the operation of said exciter generator over the entire operating range in accordance with the current flowing through said armature and in accordance with the current flowing through said field-magnet winding.

9. In a regulator system, the combination comprising a momentum operated dynamo-electric machine and means comprising two electromagnets respectively operated in accordance with the energization of the armature and of the field-magnet winding of said machine and a pivoted lever controlled thereby for limiting the ratio between the armature energization and the energization of the field-magnet winding.

10. In a regulator system, the combination comprising a momentum-operated dynamo-electric machine having an armature and a field-magnet winding, and means for varying the current flowing through said field-magnet winding above and below a predetermined normal value to limit the ratio of the currents flowing through the armature and the field-magnet winding, said means being automatically operated in one direction and manually operated in the opposite direction.

11. In a regulator system, the combination comprising a dynamo-electric machine having an armature and a field-magnet winding, and means comprising two electromagnets respectively controlled by the currents flowing through the armature and the field-magnet winding for governing the excitation of said field-magnet winding below a predetermined normal value, and manual means for controlling the excitation of said field-magnet winding above a predetermined normal value.

In testimony whereof, I have hereunto subscribed my name this 8th day of September, 1920.

CLARENCE A. BODDIE.